(12) United States Patent
Yamada (10) Patent No.: US 7,258,211 B2
(45) Date of Patent: Aug. 21, 2007

(54) ROTARY DAMPER

(75) Inventor: Shinichi Yamada, Wako (JP)

(73) Assignees: Honda Motor Co., Ltd., Tokyo (JP);
Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/802,899

(22) Filed: Mar. 16, 2004

(65) Prior Publication Data

US 2004/0211632 A1   Oct. 28, 2004

(30) Foreign Application Priority Data

Mar. 20, 2003   (JP) ............................. 2003-079157

(51) Int. Cl.
  *F16F 9/14*   (2006.01)
  *B61H 13/00*   (2006.01)
(52) U.S. Cl. ...................... 188/306; 188/130
(58) Field of Classification Search ........ 188/306–310, 188/290, 130, 294; 280/272, 90, 276; 74/551.1, 74/551.2; 16/51, 82, 58, 54; 4/246.2, 248
  See application file for complete search history.

(56) References Cited

U.S. PATENT DOCUMENTS 3,419,114 A * 12/1968 Rumsey ...................... 188/280
4,773,514 A * 9/1988 Gustafsson ................. 188/306
4,886,149 A * 12/1989 Uehara et al. .............. 188/306
5,901,821 A * 5/1999 Hanawa ...................... 188/277
2003/0127824 A1* 7/2003 Hasegawa et al. .......... 280/272
2003/0146594 A1* 8/2003 Bunya et al. ............... 280/272
2003/0234508 A1* 12/2003 Hanawa et al. ............. 280/272
2004/0200680 A1* 10/2004 Yamada et al. ............. 188/293
2004/0211632 A1* 10/2004 Yamada ...................... 188/290

FOREIGN PATENT DOCUMENTS

| JP | 9-72368 | * | 3/1997 |
| JP | 09126264 A | * | 5/1997 |
| JP | 2001-99208 | | 4/2001 |

* cited by examiner

*Primary Examiner*—Xuan Lan Nguyen
(74) *Attorney, Agent, or Firm*—Hamre, Schumann, Mueller & Larson, P.C.

(57) ABSTRACT

A rotary damper having an oil chamber within a housing which is divided into two by a vane, and generates a damping force by passing operating oil between the two oil chambers when the vane oscillates, has a shaft supporting the vane to allow oscillation in relation to the housing, fixed to a base part of the vane, and seal washers for dividing in a fluid-tight manner between a bearing rotatably supporting the shaft on the housing shaft, and the oil chamber, is provided on the base part of the vane.

7 Claims, 10 Drawing Sheets

ROTARY DAMPER

Priority is claimed on Japanese Patent Application No. 2003-079157, filed Mar. 20, 2003, the content of which is incorporated herein by reference.

BACKGROUND OF THE INVENTION

1. Field of the Invention

The present invention relates to a rotary damper.

2. Description of Related Art

As a conventional rotary damper, there is known one having an oil chamber within a housing which is divided in two by a vane, and generates a damping force by passing operating oil between the two oil chambers when the vane oscillates. This has a shaft supporting the vane to allow oscillation in relation to the housing while the base part of the vane is linked in a fixed state (for example, see FIGS. 2 and 3 in the left-hand column of page 3 of Japanese Unexamined Patent Application, First Publication No. 2001-99208).

The aforementioned conventional rotary damper has the following problem.

That is, in the conventional rotary damper the oil chamber in the housing is divided in two by the vane. However, there is a small gap between the shaft supporting the vane and the housing bearing supporting the shaft due to the two sliding in relation to each other, and this gap provides a location for leakage so that the operating oil in the two chambers within the housing is able to bypass, thus reducing the damping force.

SUMMARY OF THE INVENTION

The present invention takes into consideration of the aforementioned situation, with an object of providing a rotary damper wherein a high damping force is obtained without leakage of the operating oil from the bearing supporting the shaft.

In order to resolve the aforementioned problem, the rotary damper of the present invention has an oil chamber within a housing which is divided into two by a vane, and generates a damping force by passing operating oil between the two oil chambers when the vane oscillates, and has a shaft supporting the vane to allow oscillation in relation to the housing, and a seal part dividing in a fluid-tight manner between a bearing rotatably supporting the shaft on the housing, and the oil chamber, is provided on the base part of the vane.

The seal part may have; a pair of washers sandwiched between an inner face of the oil chamber and the base part of the vane, the base part of the vane contacting with the washers, an inner face of the housing, and a sealing member provided to the vane which seals in a fluid-tight manner between the vane and the inner face of the housing.

Interconnected fitting grooves may be formed in each part of the vane facing the inner face of the oil chamber, and the sealing member may be fitted and secured in the fitting grooves.

The base part of the vane may be located between the fitting grooves and the shaft.

The sealing member may contact the periphery of the washers.

The sealing member may have an elastic body, and the external dimension of a part in sliding contact with the inner face of the housing may be larger than the dimension of the inner face of the housing.

The housing may be provided with a body and a cap holding the shaft, and the vane may be contained within the oil chamber of a fan-shape, formed between the body and the cap.

According to the rotary damper of the present invention, when the oil pressure in one of the oil chambers increases, even if the operating oil in this oil chamber attempts to flow into the other oil chamber via the gap between the shaft (the sliding part) and the bearing, such migration of the operating oil is inhibited since the seal part dividing the space between the bearing and the oil chamber is provided in the base part of the vane. Since there is no leakage of operating oil from the bearing, the damper can provide a high damping force.

DETAILED DESCRIPTION OF THE INVENTION

An embodiment of a motorcycle incorporating a rotary damper according to the present invention is explained below with reference to the drawings. The directions front-rear and left-right described in the explanation are relative to the chassis of the motorcycle.

Figure 1:
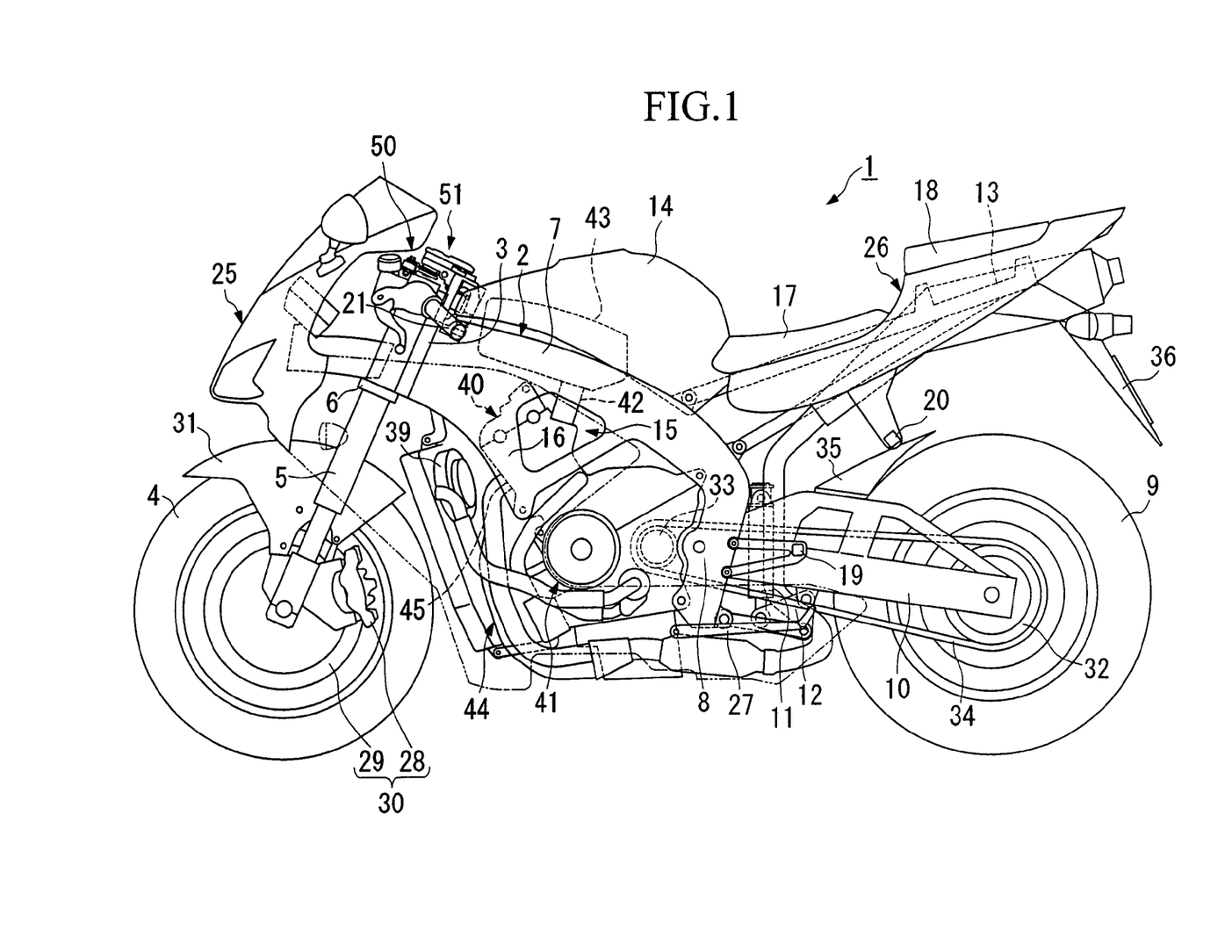
FIG. 1 is a side view of a motorcycle provided with the rotary damper of the present invention.

As shown in FIG. 1, the motorcycle 1 of this embodiment is provided with a chassis frame 2 approximately in the center, and a head pipe 3 provided at the front end of the chassis frame 2 whereon a front fork 5 supporting a front wheel 4 is supported via a steering stem 6 to allow steering. A main frame 7 is provided diverging left and right from the head pipe 3 of the chassis frame 2, extending at an angle rearwards and downwards, and thence through a bend and downwards. A pivot part 8 is provided approximately at the center on the front edge of the part of the main frame 7 extending downwards. A rear fork 10 supporting the rear wheel 9 is able to swing on this pivot part 8. Furthermore, a part slightly rearwards of the point supported by the pivot part 8 of the rear fork 10 is linked to the main frame via a rear cushion 11 and a link part 12.

A seat frame 13 is linked to the rear of the main frame 7. A fuel tank 14 is located above the main frame 7, and a water-cooled four-cylinder engine 15 is located beneath the main frame 7. An engine hanger 16 extends down below the front of the main frame 7, and this engine hanger 16 supports the engine 15, and other mounting parts supporting the engine, provided on the main frame 7.

A driver's seat 17 and a passenger pillion seat 18 are individually supported by the seat frame 13 behind the fuel tank. Moreover, a driver's step 19 is mounted behind the pivot part 8 of the chassis frame 2, and a passenger's step 20 is mounted on the bottom part of the seat frame 13. Furthermore, a pair of handlebars 21 (left and right) are mounted on the top end of the front fork 5 via a top bridge 49 (see FIG. 2).

The front part of the chassis of the motorcycle 1 is covered by a front cowl 25, and the area around the seat frame 13 is covered by a rear cowl 26. Moreover, a stowable side stand 27 is arranged at the bottom-left of the chassis frame 2, so that the chassis of the motorcycle 1 can be supported standing inclined to the left by this side stand 27.

A brake caliper 28 is mounted at the bottom end of the front fork 5, and a brake rotor 29 associated with the brake caliper 28 is mounted on the front wheel 4. A front brake 30 has the brake caliper 28 and the brake rotor 29. A front fender 31 is mounted on the bottom end of the front fork 5 and covers the top of the front wheel 4.

A rear sprocket 32 is fixed to the left side of a rear wheel 9 such that it rotates together with the rear wheel. A drive chain 34 is wrapped around the rear sprocket 32 and a drive sprocket 33 located at the left at the rear of the engine 15, to transmit the driving force to the rear wheel 9. A front rear fender 35 is mounted above the rear fork 10 and covers the front part of the rear wheel 9, and a rear fender 36 is mounted under the rear cowl 26 and covers the top rear of the rear wheel 9. A rear brake apparatus of the same configuration as the front brake apparatus 30 on the front wheel 4, is provided on the rear frame 10.

Cylinders 40 of the engine 15 are provided above a crankcase 41 and inclined slightly forward. Throttle bodies 42 are connected to the rear of each of the cylinders 40. Each throttle body is connected to an air cleaner case 43 located between the main frame 7 and the fuel tank 14. Furthermore, exhaust pipes 44 corresponding to each cylinder are connected to the front of each of the cylinders 40. The exhaust pipes 44 extend forward from front walls 45 of the cylinders 40, bend downwards, pass in front of and underneath the crankcase 41 and extend to the rear of the engine 15.

The steering stem 6, a top bridge 49 located parallel to a bottom bridge above the steering stem 6, and the handlebars 21 and the like, constitute a steering system 50 for steering the front wheel 4. A rotary damper 51 is mounted between this steering system 50 and the chassis frame 2 (see FIGS. 2 and 3).

The rotary damper 51 is employed as a steering damper to attenuate vibration of the handlebars 21 due to kickback and the like in the event of external disturbance.

Figure 2:
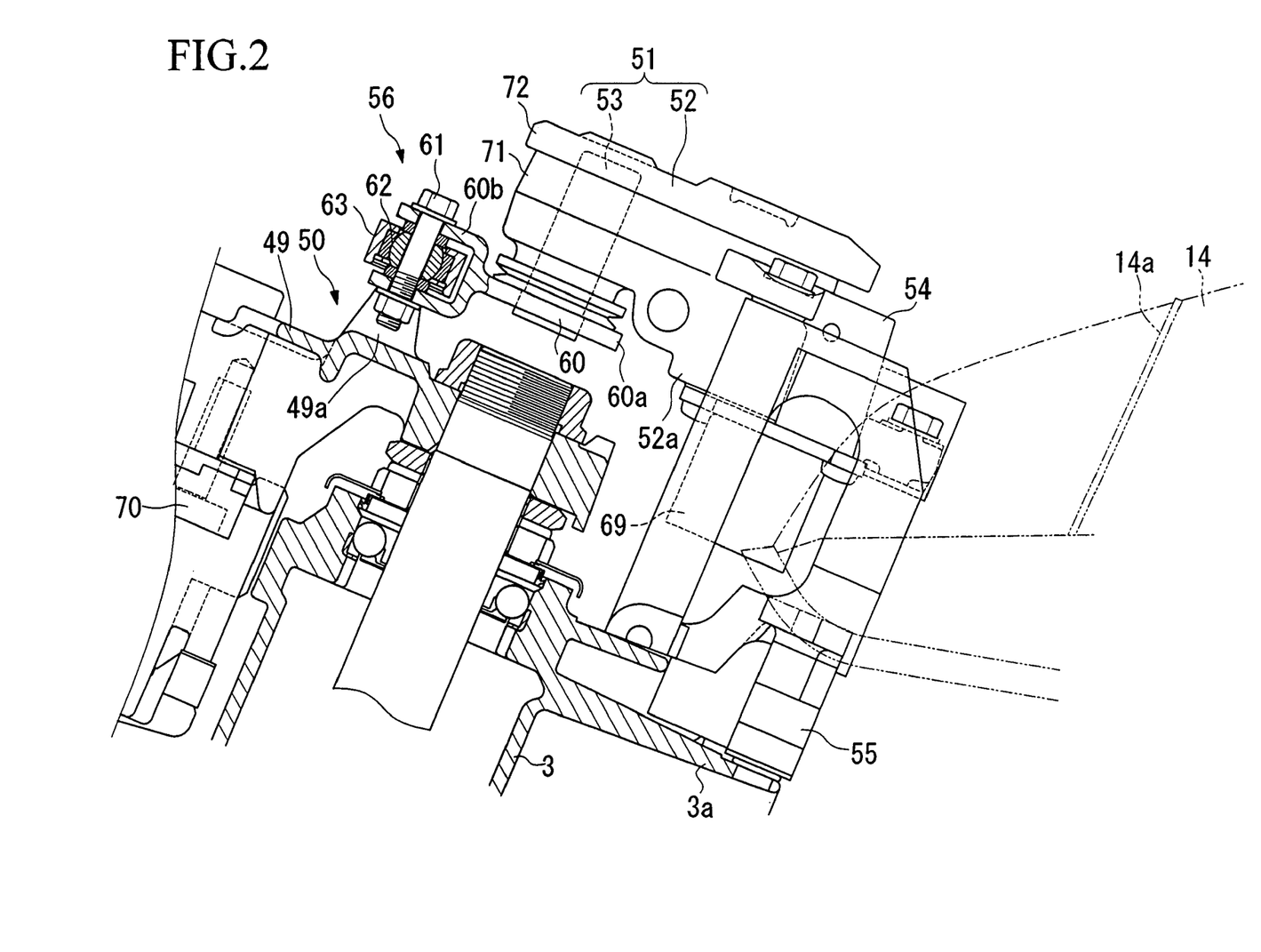
FIG. 2 is a drawing showing a partial section in side view of a mounting structure of the rotary damper of the motorcycle.

As shown in FIG. 2, the rotary damper 51 has a housing 52, and a shaft 53 projecting through a bottom face of the housing 52 to its exterior. The housing 52 is integral with the head pipe 3, and is mounted on a mounting part 3a provided such that it extends towards the rear, via a first bracket 54 and a second bracket 55. The shaft 53 is mounted on the top bridge 49 via a link mechanism 56.

Figures 4A, 4B:
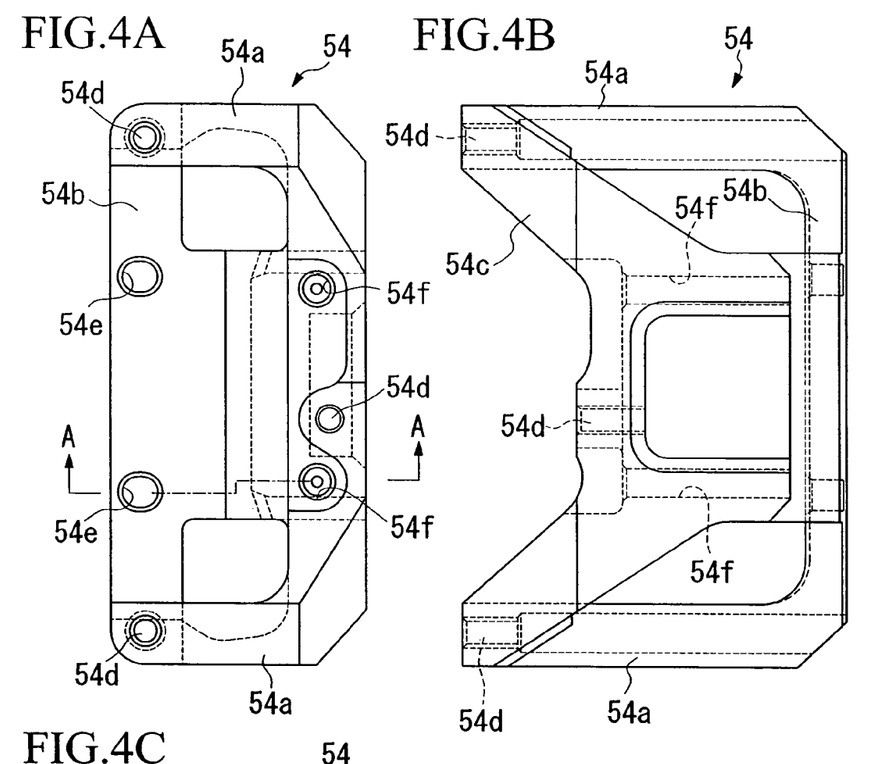
FIGS. 4A to 4C show a first bracket employed in mounting the rotary damper, FIG. 4A being a plan view, FIG. 4B being a side view, and FIG. 4C being a section view along the line A-A in FIG. 4A.
Figure 4C:
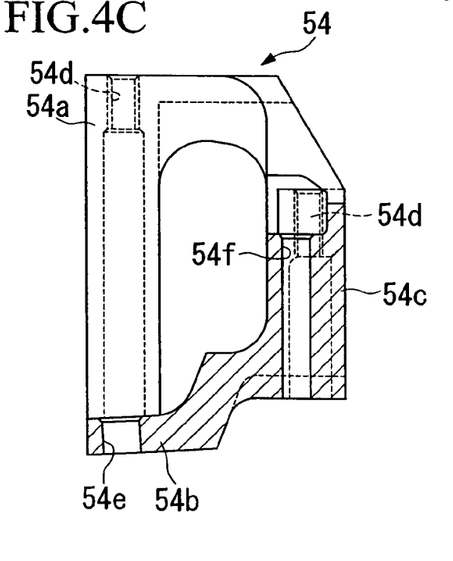

As shown in FIGS. 4A to 4C, the first bracket 54 is of an approximate hollow box shape, and has left and right side walls 54a, a base plate 54b, and an approximately Y-shaped footing 54c linked to the rear edge of the side plates 54a and base plate 54b. Mounting holes 54d are formed in the top face of the left and right side walls 54a and the top face of the Y-shaped foot 54c, and the rotary damper 51 is bolted in place via these mounting holes 54d. Moreover, mounting holes 54e are formed in the base plate 54b, and mounting holes 54f are formed in the Y-shaped footing 54c. The first bracket 54 is bolted to the mounting part 3a of the head pipe 3 via these mounting holes 54e.

Figure 5A:
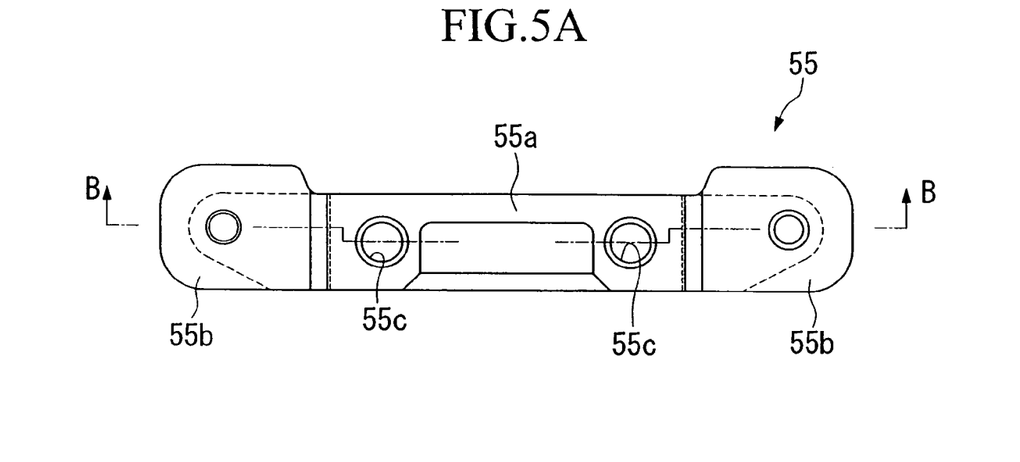
FIGS. 5A and 5B show a second bracket employed in mounting the rotary damper, FIG. 5A being a plan view, and FIG. 5B being a section view along the line B-B in FIG. 5A.
Figure 5B:
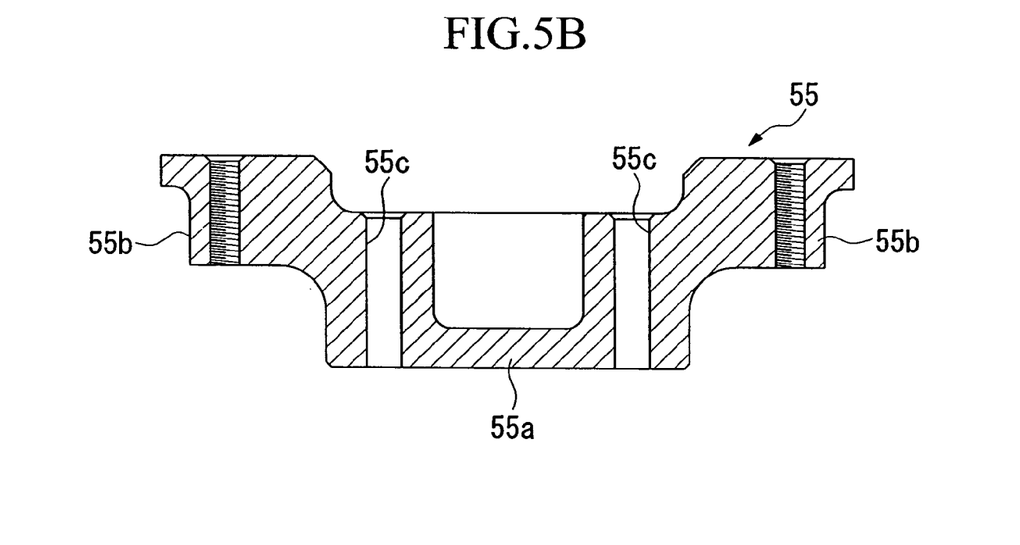
Figure 6:
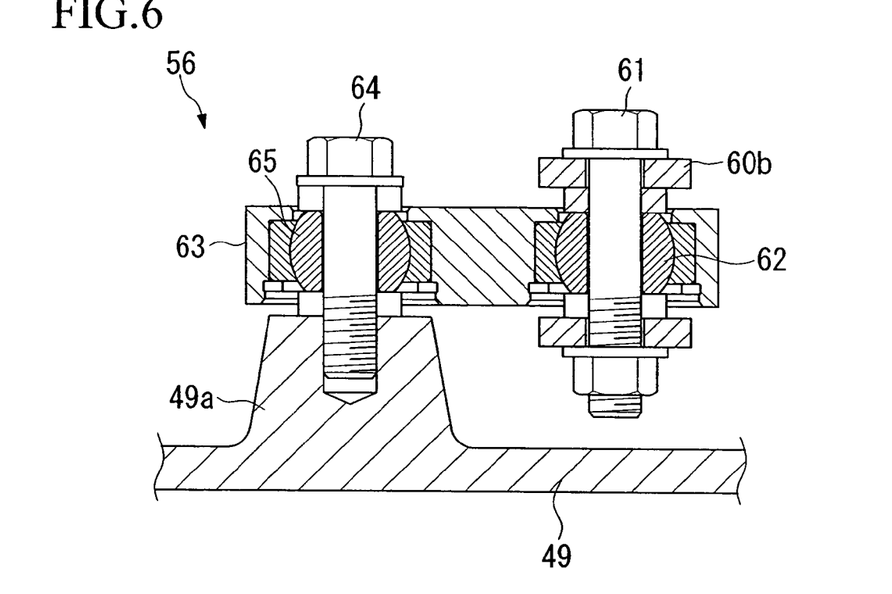
FIG. 6 is a section view along the line C-C in FIG. 3.
Figure 7:
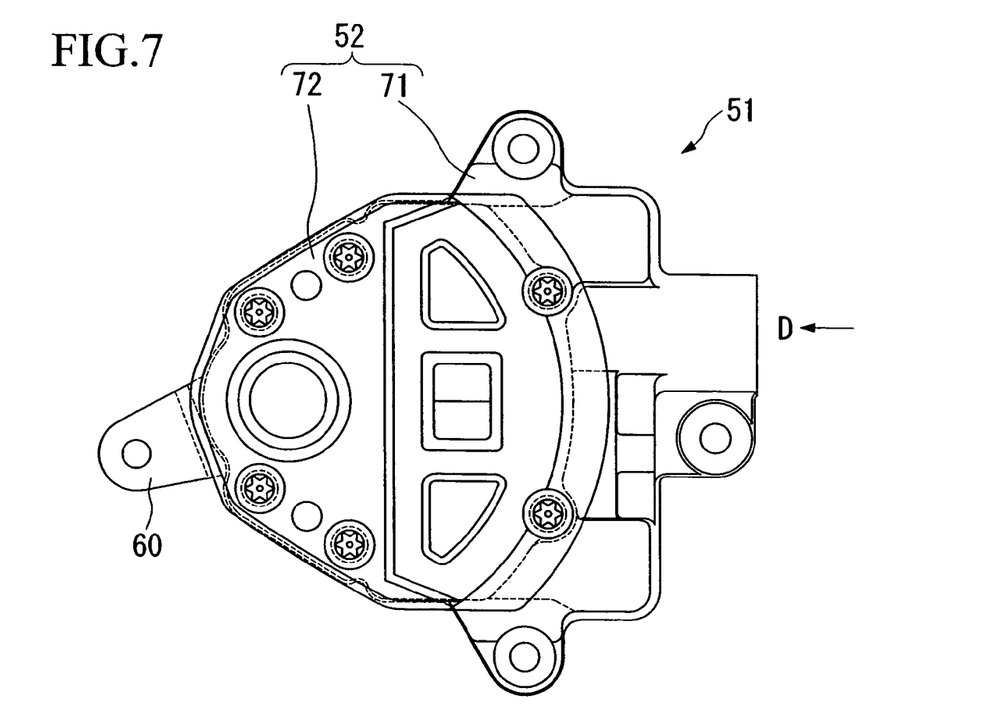
FIG. 7 is a plan view of the rotary damper.
Figure 8:
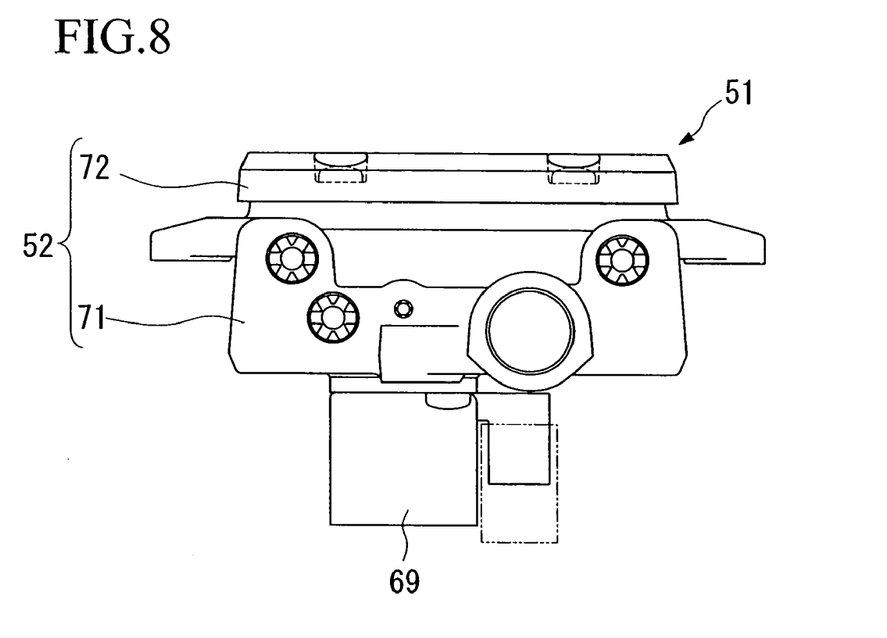
FIG. 8 is a view as seen in the direction of the arrow D in FIG. 7.
Figure 9:
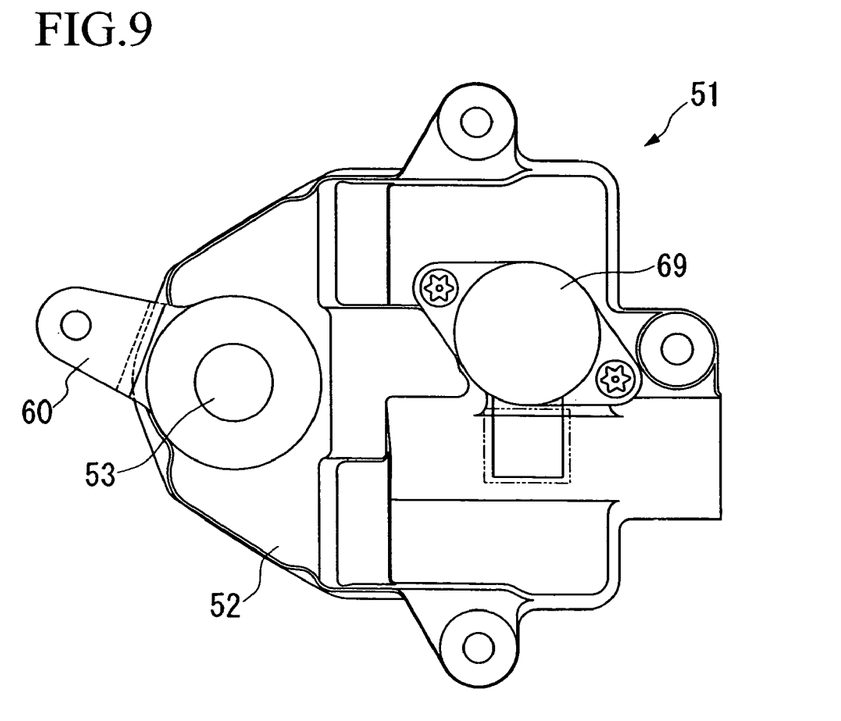
FIG. 9 is a bottom view of the rotary damper.

As shown in FIGS. 5A and 5B, the second bracket 55 has a base part 55a formed in an approximately rectangular shape, and left and right overhanging parts 55b extending upwards and overhanging from either side of the base part 55a. Mount holes 55c are formed on the base part 55a such that the mounting holes 55c are coaxial with the mounting holes 54f of the first bracket 54. The second bracket 55 and the first bracket 54 are mounted one above the other with a single bolt inserted through the coaxial mounting holes 54f and 55c, the second bracket 55 then being mounted on the head pipe 3 together with the first bracket 54 with this single bolt.

Figure 3:
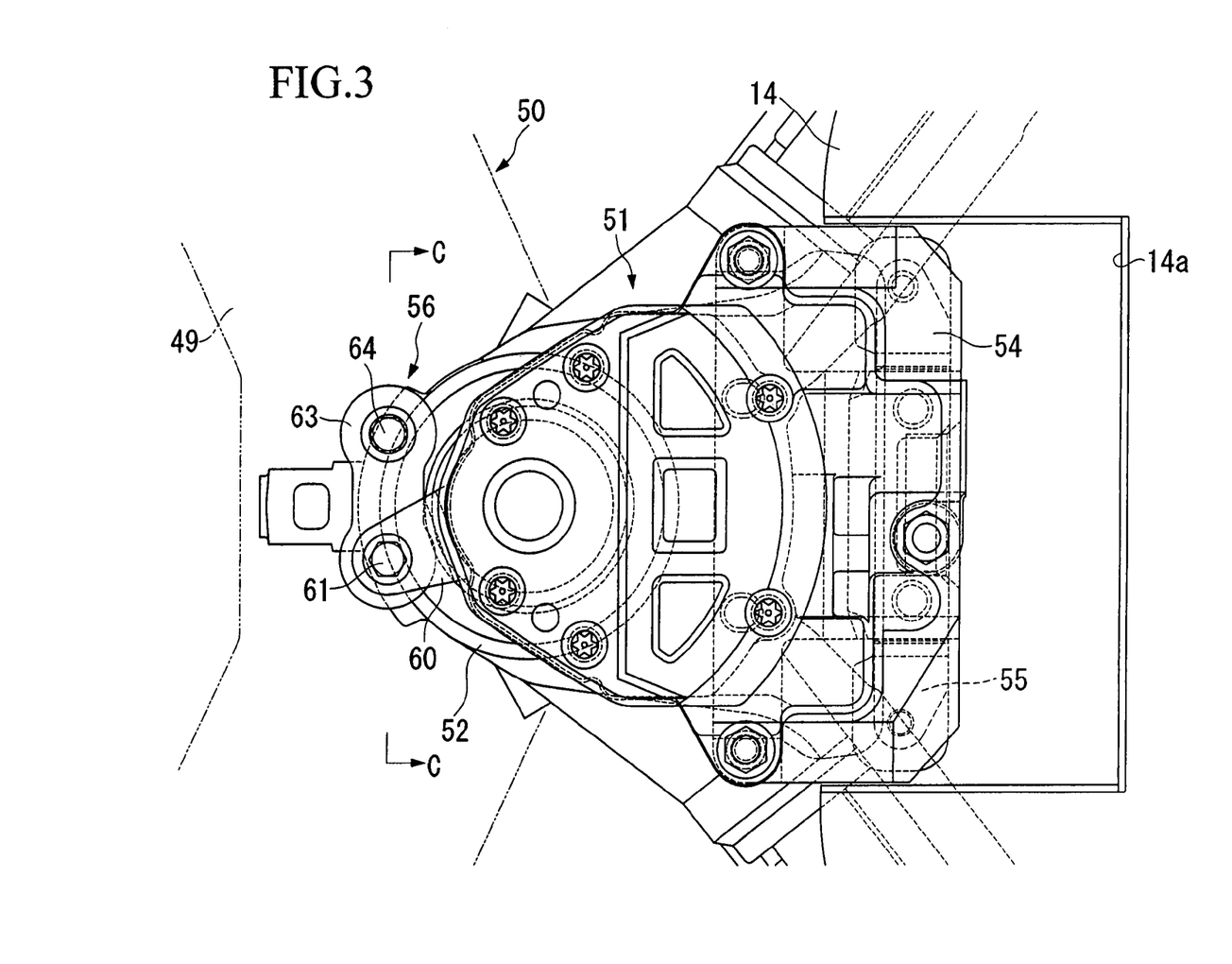
FIG. 3 is a plan view showing the mounting structure of the rotary damper of the motorcycle.

The following explains the link mechanism 56. As shown in FIGS. 2, 3, and 5, one end 60a of an arm 60 is mounted on the shaft 53 projecting downwards of the rotary damper 51, and on the other end 60b of the arm 60 which is divided in two, is spherically supported one end of a link member 63 having two holes, via the bolt 61 and a ball member 62 or the like engaged on the outer periphery of the bolt 61. Furthermore, the other end of the link member 63 is spherically supported on a mounting part 49a formed on the top bridge 49, via a bolt 64 and a ball member 65 engaged on the outer periphery of the bolt 64. In other words, the arm 60, the bolts 61 and 64, the ball members 62 and 65, and the link member 63 includes a link mechanism 56 to transfer movement of the top bridge 49 to the shaft 53.

As shown in FIG. 2, the housing 52 of the rotary damper 51 extends behind, and is mounted on, the top bridge 49 via the first and second brackets 54 and 55. A linear solenoid 69 as an example of a driver for driving and controlling an oil pressure control valve 68 (see FIG. 10) is located below the extension 52a of the housing 52 extending behind the top bridge 49.

In order to avoid interference of the rotary damper 51 and first and second brackets 54 and 55, a recessed part 14a is formed in the front of the fuel tank 14. The symbol 70 in FIG. 2 indicates the ignition switch located at the front of the head pipe.

Figure 10:
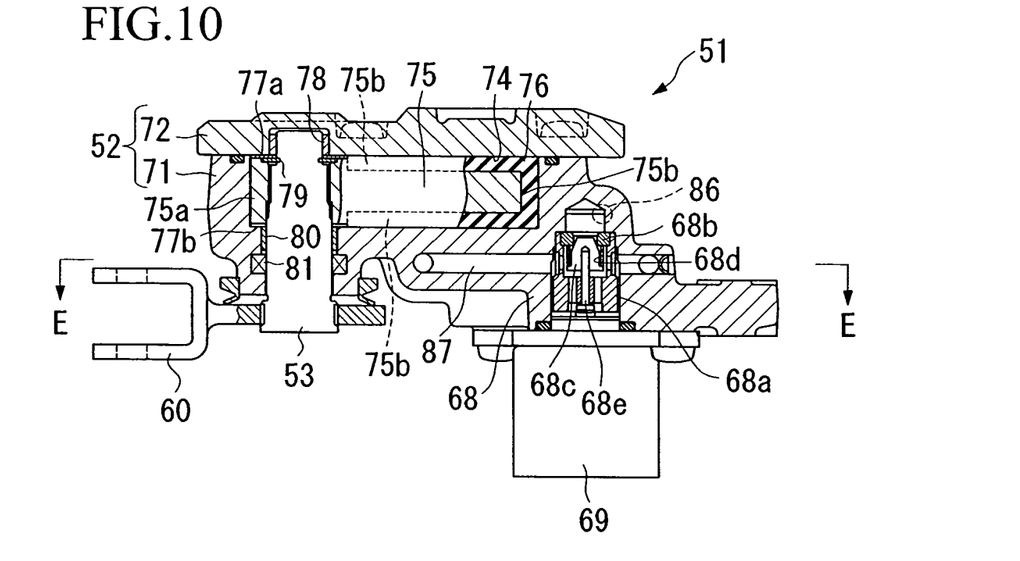
FIG. 10 is a section view of the rotary damper.

As shown in FIGS. 7 to 9 and 11, the housing 52 of the rotary damper 51 is formed from a body 71 and a cap 72. A fan-shaped recessed part 73 is formed on the top face of the body 71, and this recessed part 73 is covered by the cap 72 to form an oil chamber 74a. The oil chamber 74 is divided into left and right oil chambers 74a and 74b by a vane 75. As shown in FIG. 10, the base part 75a of the vane 75 is formed in a cylindrical shape, and the shaft 53 is linked in a fixed state to this cylindrical part so that the shaft 53 rotates together with the vane 75 via a fastener such as a spline or the like. The vane 75 is supported such that it is able to oscillate in relation to the housing 52 by means of the shaft 53. Moreover, the shaft 53 is supported such that it is able to rotate freely via the bushings 78 and 80 of the bearings 71a and 72a provided in the body 71 and cap 72 (see FIG. 14).

Mutually connected grooves 75b are formed in the top end, bottom end, and rear end facing the inner peripheral face of the oil chamber 74 of the vane 75. These grooves 75b are inlaid with a sealing member 76 including an elastic material such as rubber or the like formed in a U-shape to match the shape of the grooves 75b. Here, the grooves 75b and the sealing member 76 do not reach the shaft 53, but are formed or fitted to extend to a point before it. In other words, the vane base part 75a is located between the groove (inlay groove) 75b and the shaft 53. Furthermore, the height of the sealing member 76 is set greater than the depth of the groove 75b, and thus the top projects from the groove 75b. That is to say, the sealing member 76 is made such that the external dimensions of the parts in sliding contact with the inner face of the oil chamber 74 are greater than the internal dimensions of the oil chamber 74. The projecting parts contact the inner peripheral face of the body 71 partitioning the oil chamber 74, and of the cap 72, and sealing washers 77a and 77b (to be explained below) with an appropriate interference.

Figure 14:
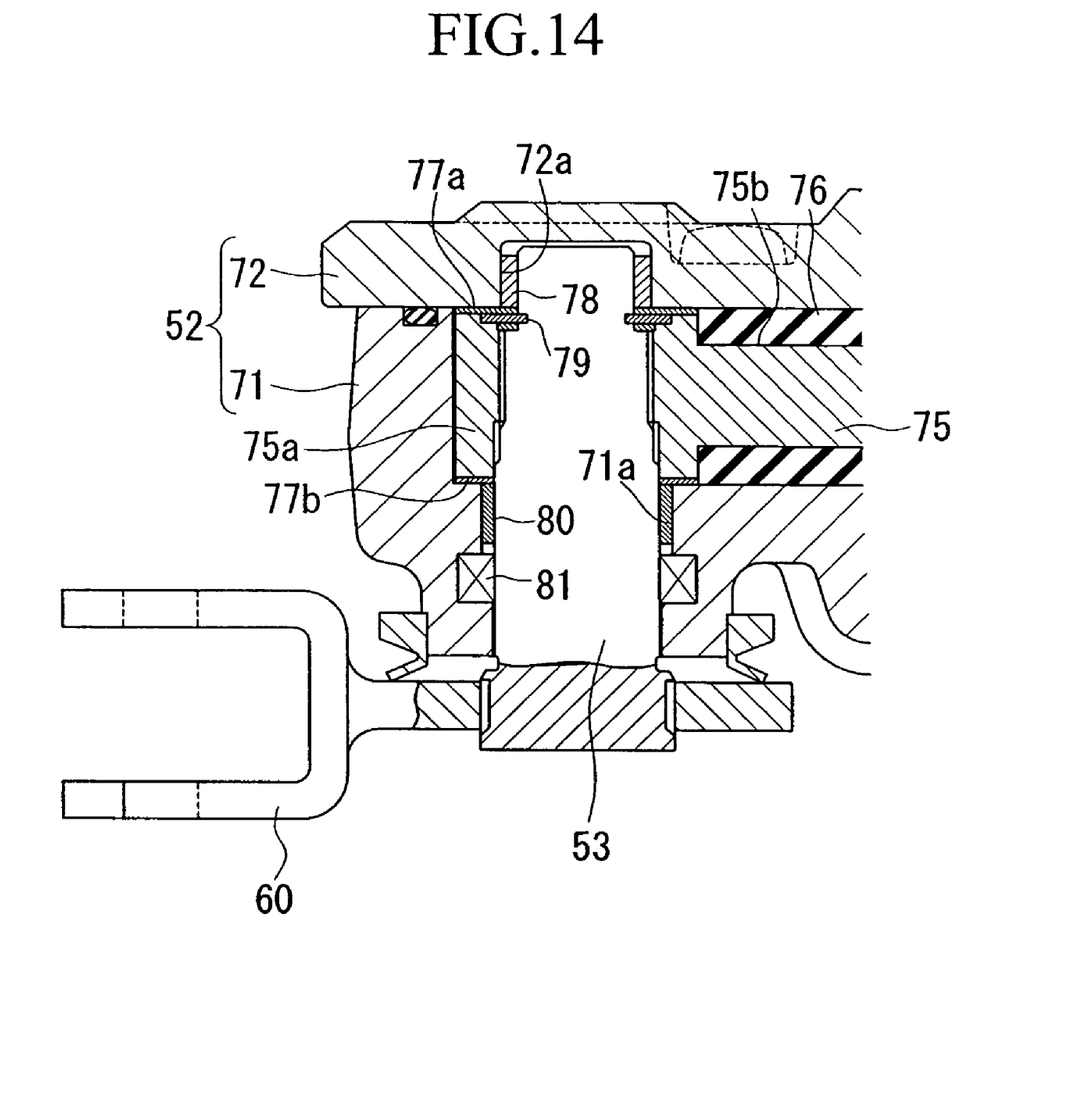
FIG. 14 is an enlarged view of a part in FIG. 10.

As shown in FIG. 14, the sealing washers 77a and 77b are fitted to the periphery of the shaft 53 such that they are in contact with the top and bottom faces of the base part 75a of the vane 75. The sealing washers 77a and 77b are manufactured, for example, of metal, and are such as to prevent operating oil in the oil chambers 74a and 74b passing through the space between the base part 75a of the vane 75 and the bottom face of the cap 72, and the space between the base part 75a of the vane 75 and the body 71, to the bearings 71a and 72a.

That is, the two oil chambers 74a and 74b partitioning the housing 52 interior are maintained mutually fluid-tight by the sealing member 76 and the sealing washers 77a and 77b, and are also fluid-tight in relation to the bearings 71a and 72a.

Here, the seal partitioning the bearings 71a and 72a supporting the shaft to permit its rotation, and the oil chambers 74a and 74b, in a fluid-tight manner includes the pair of sealing washers 77a and 77b sandwiched between the inner faces of the oil chambers 74a and 74b, the vane base part 75a contacting to these sealing washers 77a and 77b, an inner face of the housing 52, and the sealing member 76.

The bushing 78 is fitted at the top part of the location wherein the washer 77a for sealing the shaft 53 is fitted, and a circlip 79 is fitted at the bottom part of the location wherein the sealing washer 77a is fitted. Moreover, the bushing 80 and an oil seal 81 are respectively fitted at the bottom part of the location wherein the sealing washer 77b for sealing the bottom side of shaft 53 is fitted.

Figure 11:
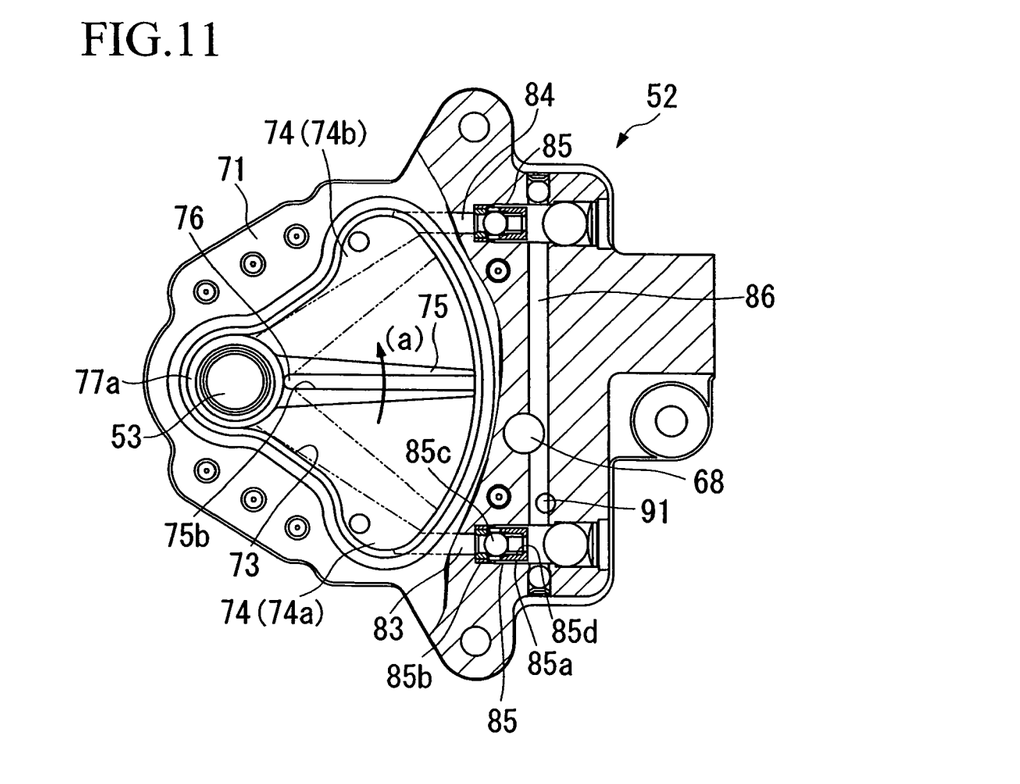
FIG. 11 is a partial section in plan view of the housing body of the rotary damper.
Figure 12:
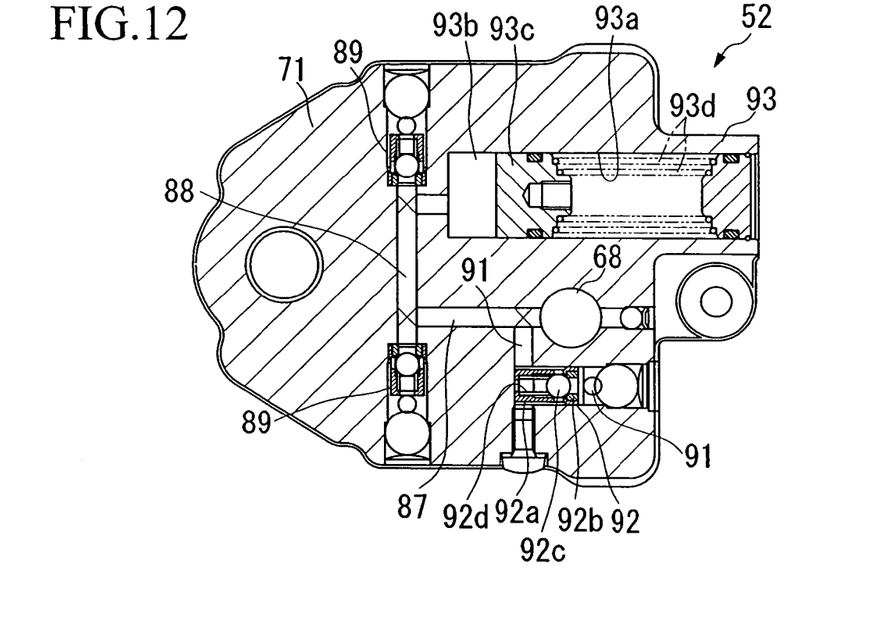
FIG. 12 is a section view along the line E-E in FIG. 10.
Figure 13:
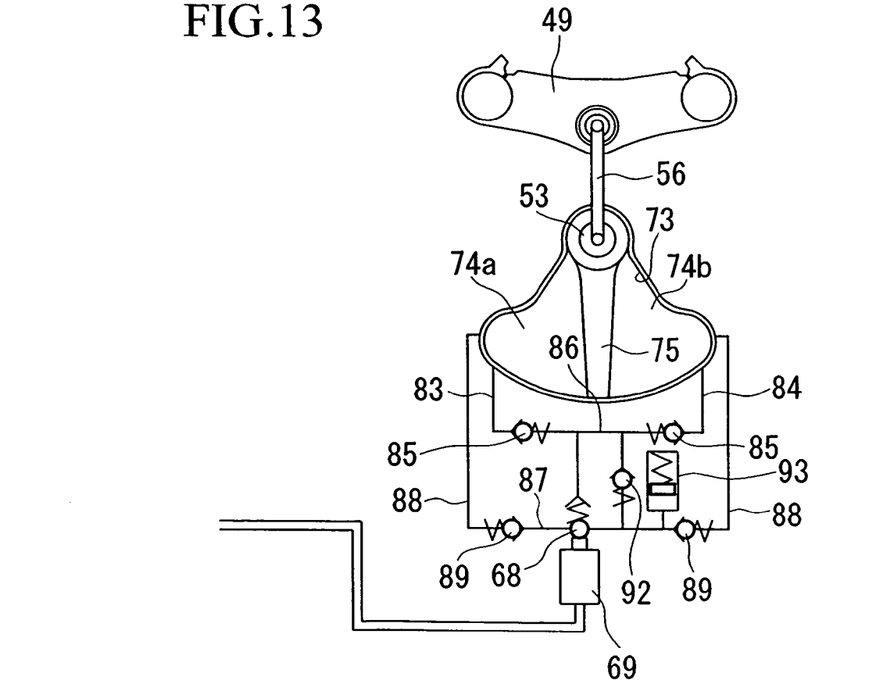
FIG. 13 shows the overall configuration of the rotary damper.

As shown in FIGS. 10 to 12, in the body 71 of the housing 52, oil passages 83 and 84 connecting to the left and right oil chambers 74a and 74b respectively, which extend beyond the rear end of the inner peripheral face of the oil chambers 74a and 74b and are approximately parallel to each other, are formed. Non-return valves 85 are fitted in each of the oil passages 83 and 84. An oil passage 86 is formed at the rear ends of the oil passages 83 and 84, connecting and approximately perpendicular to the oil passages 83 and 84. The oil passage 86 is connected to a bottom oil passage 87 extending perpendicularly to the oil passage 86, via an oil pressure control valve 68 located vertically (see FIG. 12). The oil passage 87 extends forward from a point wherein the oil pressure control valve 68 is provided, so that it reaches the bottom of the oil chamber 74, and its front end connects to an oil passage 88 being approximately perpendicular to the oil passage 87. Non-return valves 89 are fitted in the vicinity of the left and right ends of the oil passage 88, and the left and right tips of the oil passage 87 are extended further to the edge of the body, turn upwards, and connect to the left and right oil chambers 74a and 74b. That is, the oil passages 83, 84, 86, 87 and 88 are formed in top and bottom levels in the body 71 of this housing 52.

The non-return valves 85 and 89 have the same configuration. Taking the example of the non-return valve 85, a valve seat 85b is provided in a valve body 85a which contains a ball 85c, and an appropriate pressure is applied by a spring 85d so that this ball 85c contacts the valve seat 85b. In the non-return valve 85, the ball 85c acts against the urging force of the spring 85d, allowing flow of the fluid in the direction wherein the ball separates from the valve seat 85b, and preventing flow of the fluid in the opposite direction. The non-return valve 85 allows flow of the operating oil from the oil chambers 74a and 74b to the oil passage 86 side via the oil passages 83 and 84, and prevents flow of the operating oil in the opposite direction. The non-return valve 89 allows return of the operating oil to the oil chambers 74a and 74b via the oil passage 88, and prevents flow of the operating oil in the opposite direction.

The oil pressure control valve 68 shown in FIG. 10 varies the damping force of the rotary damper 51. In the oil pressure control valve 68, a valve seat 68b is provided in a valve body 68a, and a poppet 68c is accommodated therein facing the valve seat 68b. To separate the poppet 68c from the valve seat 68b, an appropriate pressure is applied by a spring 68d mounted between a spring washer at the base of the poppet 68c and the valve seat 68b. The top end of a pushrod 68e is inserted into the bottom end of the poppet 68e, and the bottom end of the pushrod 68e is connected to the linear solenoid 69. The pressure on the poppet 68c is adjusted by excitation of the linear solenoid 69 so that the head contacts the valve seat 68c in opposition to the urging force of the spring 68d.

That is to say, with the oil pressure control valve 68, the position of the poppet 68c is determined by the difference in pressure between the left and right oil chambers 74a and 74b within the housing 52 connecting the space between the head and base, the urging force of the spring 68d, and the excitation force of the linear solenoid 69 via the pushrod 68e. When the sum of the poppet pressure based on the difference in pressure between the left and right oil chambers 74a and 74b and the urging force of the spring 68d is less than the excitation force of the linear solenoid 69, the poppet 68c contacts the valve seat 68b and the oil pressure control valve 68 is closed, and when the sum of the poppet pressure based on the difference in pressure between the left and right oil chambers 74a and 74b and the urging force of the spring 68d exceeds the excitation force of the linear solenoid 69, the poppet 68c separates from the valve seat 68b and the oil pressure control valve 68 is opened. A predetermined damping force is then obtained when the operating oil passes through the gap between the valve seat 68b of the oil pressure control valve 68, and the poppet 68c.

The linear solenoid 69 is controlled by a control unit (not shown in the figures) such that the excitation force increases as the speed of the motorcycle and the acceleration of the chassis increases.

As shown in FIG. 12, a bypass oil passage 91 is formed between the oil passage 86 and the oil passage 87, and a relief valve 92 is installed in this bypass oil passage 91. In the relief valve 92, a valve seat 92b is provided in the valve body 92a, and a ball 92c is accommodated therein. The structure of the ball 92c is such that an appropriate pressure is applied to the valve seat 92b by a spring 92d. The ball 92c is normally in contact with the valve seat 92b. However when the difference in pressure between the oil passage 86 and the oil passage 87 is equal to or greater than the prescribed value, the ball 92c moves against the urging force of the spring 92d to separate from the valve seat and open the valve, and the difference in pressure between the oil passage 86 and the oil passage 87 is reduced.

Furthermore, a free piston 93 is communicated with the oil passage 88. The free piston 93 is provided with a cylinder 93a formed integral with the body 71, a piston 93c including a collection part 93b at the front of the cylinder 93a to collect operating oil, and a spring 93d to apply a force to the piston 93c towards the collection part. The free piston 93 is such that the capacity of the collection part 93b changes to accommodate thermal expansion of the operating oil by movement of the piston 93c when operating oil filling the closed space formed from the oil chambers 74a and 74b, and the oil passages 83 and 84 and the like communicating with the oil chambers, expands or contracts with temperature.

The following explains the operation of the rotary damper of the aforementioned configuration.

If, for example, the handlebars 21 are turned to the left while traveling, the top bridge 49 rotates together in the same direction as the handlebars 21, and the movement of the top bridge 49 is transmitted to the shaft 53 of the rotary damper 51 via the link mechanism 56. The shaft 53 then rotates in the anti-clockwise direction in FIG. 11, and the vane 75 rotates in the same direction ((a) in FIG. 11). The oil chamber 74b then becomes smaller, the pressure of the operating oil filling the oil chamber 74b then increases, and the operating oil in the oil chamber 74b reaches the oil passage 86 via the oil passage 84 and the non-return valve 85, and then reaches the pressure control valve 68.

In the pressure control valve 68, the excitation force of the linear solenoid 69 normally holds the poppet 68c in contact with the valve seat 68b in the closed condition. For example, the closed condition is maintained even if a small operating oil pressure is applied from the oil chamber 74a side. However when the sum of the pressure based on the pressure difference between the left and right oil chambers 74a and 74b and the spring 68d force exceeds the linear solenoid 69 excitation force, the poppet 68c separates from the valve seat 68b and the pressure control valve 68 opens. In this case, the operating oil in the oil passage 86 passes through the gap between the valve seat 68b of the oil pressure control valve 68 and the poppet 68c, passes through the oil passage 87, the oil passage 88, and the non-return valve 89, and reaches the left oil chamber 74a. The resistance when the operating oil passes through the pressure control valve 68 and the like generates the damping force acting on the handlebars 21. In other words, it acts as a resistance when the handlebars 21 are turned, and acts as a resistance to the turning force applied to the handlebars 21.

The aforementioned explanation refers to the case wherein the handlebars 21 are turned to the left. The case wherein the handlebars 21 are turned to the right is similar.

The linear solenoid 69 is controlled by the speed of the motorcycle and the acceleration of the chassis. For example, when the speed of the motorcycle increases and the acceleration of the chassis increases, the excitation force is increased by a control unit (not shown in drawings). In this case, therefore, the valve opening timing of the oil pressure control valve 68 is delayed, and following opening of the valve as well, the degree to which the valve is opened is reduced by an amount equivalent to the increase in the excitation force, and a larger damping force is generated. In other words, the damping force increases as the speed of the motorcycle increases, or as the acceleration of the motorcycle increases.

At low speeds, or low accelerations, therefore, handling is given priority and the handlebars 21 can be turned with a comparatively light force. However at high speeds or at high accelerations, a strong damping force acts, so that occurrence of the kickback phenomena can be reduced.

If the oil pressure in either the left or right oil chamber 74a or 74b increases for some reason during control of the rotary damper 51 and the pressure difference between the upstream and downstream sides of the oil pressure control valve 68 increases beyond a preset value, the relief valve 92 opens and the operating oil in the oil passage 86 flows into the oil passage 87 via the bypass oil passage 91 to alleviate the pressure difference due to excessive opening. In other words, an excessive increase in pressure of the operating oil in one of the oil chambers is prevented. Moreover, when the temperature of the operating oil filling the oil chamber 74 and the oil passages 83 and 84 and the like changes and the operating oil expands or contracts, the piston 93c of the free piston 93 moves within the cylinder 93a, thus absorbing the change in volume of the operating oil.

Furthermore, during operation of the rotary damper 51, when the shaft 53 rotates with movement of the handlebars 21 and either the left or right oil chamber 74a or 74b becomes smaller and the pressure of the operating oil increases, part of the operating oil in the relevant oil chamber attempts to pass through the space between the vane 75 base 75a and the bottom of the cap 72, or through the space between the vane 75 base 75a and the bottom of the body 71, to the bearings 71a and 72a, and then to the other oil chamber. However, the sealing washers 77a and 77b are fitted around the periphery of the shaft 53 and in contact with the top and bottom faces of the base 75b of the vane 75, and these sealing washers 77a and 77b prevent the operating oil flowing to the bearings 71a and 72a. Therefore, the operating oil in the chamber can be prevented from flowing to the other chamber via the bearings 71a and 71b, and since there is no leakage, the rotary damper 51 is able to provide a high damping force as a damper.

Moreover, since the groove 75b formed in the vane 75 in order to accept the sealing member does not reach the shaft 53, and the vane base 75a is located on the periphery of the shaft 53, the operating oil does not leak from the groove 75b directly into the gap on the periphery of the shaft 53.

Furthermore, since the end of the sealing member 76 contacts the washers 77a and 77b, the amount of leakage of operating oil from the end of the sealing member 76 can be reduced.

Moreover, since the sealing member 76 fitted into the groove 75b of the vane 75 contacts the body 71 partitioning the oil chambers 74a and 74b, and the inner peripheral face of the cap 72 with an inherent interference, a good seal is achieved without the need for special components such as a spring or the like.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the aforementioned embodiment, the housing 52 of the rotary damper 51 is mounted on the chassis frame 2, and the shaft 53 is mounted on the steering system 50. However, conversely, the housing 52 of the rotary damper 51 may be mounted on the steering system 50, and the shaft 53 may be mounted on the chassis frame 2.

Furthermore, in the aforementioned embodiment, the oil passages 83 and 84 connecting the left and right oil chambers 74a and 74b of the rotary damper 51 are formed in the body 71 of the housing 52. However, it is not restricted to this configuration and these oil passages may be provided in the cap 72 of the housing 52, or in the vane 75.

What is claimed is:

1. A rotary damper comprising:
    a housing;
    a fan-shaped oil chamber formed in the housing;
    a vane dividing said oil chamber into two chambers;
    a shaft rotatably fastened to said housing and fixed to a base part of the vane such that said vane extends only in one direction away from said base part; and
    a seal part provided on said base part sealing in a fluid-tight manner between a bearing rotatably supporting said shaft on said housing and said two chambers, wherein:
    the oil chamber generates a damping force by passing operating oil between said two oil chambers when said vane oscillates; and
    said seal part includes:
    a pair of washers sandwiched between an inner face of the housing of said two chambers and the base part; and
    a sealing member provided to at least portions of three edges of said vane which seals in a fluid-tight manner between said vane and the inner face of said housing, said sealing member having ends facing said base part of said vane and contacting outer circumferential surfaces of said washers so as to seal in a fluid-tight manner therebetween.

2. The rotary damper according to claim 1, wherein interconnected fitting grooves are formed in each part of said vane facing the inner face of said two chambers, and said sealing member is fitted and secured in said fitting grooves.

3. The rotary damper according to claim 2, wherein the base part is located between said fitting grooves and said shaft.

4. The rotary damper according to claim 1, wherein said sealing member comprises an elastic body, and the external dimension of a part in sliding contact with the inner face of said housing is larger than the dimension of the inner face of said housing.

5. The rotary damper according to claim 1, wherein said sealing member is formed in a U-shape.

6. A rotary damper, comprising:
    a housing with a fan-shaped oil chamber;
    a shaft rotatably fastened to said housing and fixed to a base part of a vane, said vane extending away from said base part into said fan-shaped oil chamber to divide said fan-shaped oil chamber; and
    means for sealing among said shaft, said housing, and said vane, said sealing means including a sealing member mounted on a portion of said vane, said sealing member sealing between said vane and said housing, said sealing member having ends facing said shaft, said sealing means further including a pair of washers mounted about said shaft in contact with said housing and extending into said oil chamber, said washers having outer circumferential surfaces, said ends of said sealing member contacting the outer circumferential surfaces of said washers to provide a seal among said washers, said housing and said vane.

7. The rotary damper according to claim 6, wherein said sealing member is formed in a U-shape.

* * * * *